3,387,045
ISOMERIZATION OF CYCLOOCTADIENES WITH A CATALYST COMPLEX OF A NOBLE METAL HALIDE AND A NITRILE
Ernest A. Zuech, Bartlesville, Okla., assignor to Phillips Petroleum Company, a corporation of Delaware
No Drawing. Filed Dec. 31, 1964, Ser. No. 422,508
5 Claims. (Cl. 260—666)

This invention relates to an improved process for isomerizing an unconjugated cyclooctadiene to a conjugated cyclooctadiene with novel catalysts.

The dimerization of butadiene can result in the formation of vinylcyclohexene and 1,5-cyclooctadine. Cyclooctadiene represents a valuable starting material for various syntheses, but it would be very desirable in many cases to have the double bonds located in conjugated position, i.e., 1,3-cyclooctadiene. While it is recognized that cyclic olefins have been isomerized, such isomerization processes generally result in the formation of a large number of by-products.

This invention is concerned with an improved process for isomerizing unconjugated cyclic dienes to the conjugated isomer, such as the isomerization of 1,5-cyclooctadiene to 1,3-cyclooctadiene, with catalysts which substantially avoid the formation of by-products and effect exceptionally high yields of a conjugated isomer.

Accordingly, it is an object of the invention to provide an improved process for isomerizing unconjugated cyclic dienes to the conjugated isomer with novel catalysts. Another object is to provide a process for isomerizing these dienes more efficiently than has been heretofore possible. A further object is to provide a process for isomerizing unconjugated cyclooctadienes to the conjugated isomers at exceptionally high per pass and ultimate yields. Other objects of the invention will become apparent to one skilled in the art upon consideration of the accompanying disclosure.

A broad aspect of the invention comprises isomerizing unconjugated cyclic dienes, such as 1,5-cyclooctadiene to 1,3-cyclooctadiene, with a catalyst complex of a nitrile of 2–12 carbon atoms selected from the group consisting of alkanenitriles, cycloalkanenitriles, and aromatic nitriles with at least one metal halide of the formula $MX_2$ wherein M is selected from the group consisting of platinum and palladium and X is selected from the group consisting of chlorine and bromine. It has been found that these complex catalysts are particularly effective in isomerizing the cyclooctadienes without the formation of by-products. In fact per pass yield is in the area of 99 percent while the ultimate yield is 100 percent. The complex catalyst of the invention may include mixtures of platinum and palladium halides of chlorine and/or bromine. These complex catalysts are soluble in the cyclic dienes.

The complexes of the noble metal halides with the nitriles are formed by heating the platinum or palladium halide in either anhydrous or hydrated form with the selected nitrile to a temperature of about 100° C. using an excess of the nitrile. For example, bis(benzonitrile)-palladium dichloride can be readily formed by heating palladium chloride with benzonitrile for about 1–2 hours at a temperature in the range of 100–125° C. The resulting complex is then recovered by adding a diluent such as n-pentane to the mixture and cooling the resulting solution. The solid complex is then recovered from the solution and is soluble in the cyclooctadiene, for example.

Suitable nitriles for use in the invention in forming the catalyst complex with the noble metal halides include acetonitrile, propionitrile, butyronitrile, n-hexanenitrile, 2,4-dimethylhexanenitrile, 4-ethylnonanenitrile, n-undecanenitrile, cyclohexanenitrile, cyclooctanenitrile, 3-methylcyclopentanenitrile, 4-methylcyclodecanenitrile, benzonitrile, naphthonitrile, p-toluonitrile, 2,4-diethylbenzonitrile, and the like. Nitriles containing more than one nitrile group can also be used, as for example, phthalonitrile, isophthalonitrile, adiponitrile, and the like.

Unconjugated cyclooctadienes which can be isomerized to conjugated cyclooctadienes in accordance with the invention include those having the following structural formulas:

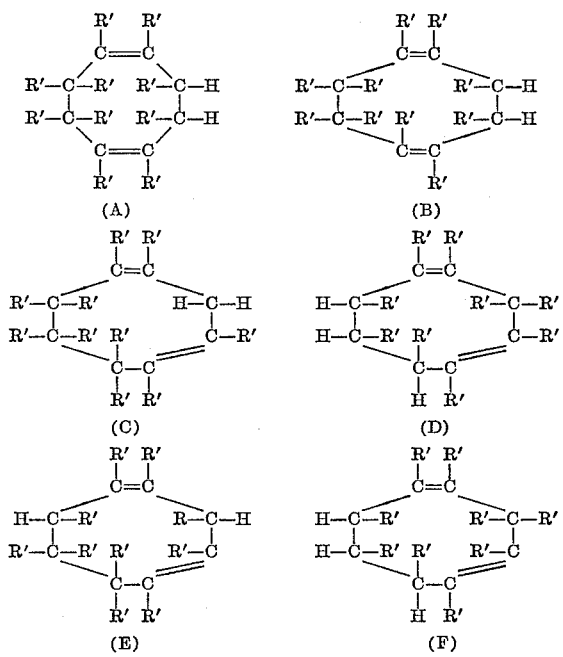

wherein each R' can be either a hydrogen atom or an alkyl group containing from 1 to 5 carbon atoms. It should be noted that in the above formulas there is at least one proton (hydrogen atom) attached to each of two adjacent allylic carbon atoms (carbon atoms adjacent the double bonds) or two protons on the same allylic carbon. Thus, the alkylated derivatives which can be isomerized in accordance with the invention are those which contain sufficient protons for double bond shifting to occur under isomerization conditions.

Examples of said unconjugated cyclooctadienes include, among others, the following:

cis,cis-1,5-cyclooctadiene;
cis,cis-3-methyl-1,5-cyclooctadiene;
cis,cis-3,7-diethyl-1,5-cyclooctadiene;
cis,cis-3,4,8-tri-n-propyl-1,5-cyclooctadiene;
cis,cis-3,4,7,8-tetra-n-pentyl-1,5-cyclooctadiene;
cis,cis-1,2,3,4,5,6,7,8-octamethyl-1,5-cyclooctadiene;
cis,trans-1,5-cyclooctadiene;
cis,trans-3-n-butyl-1,5-cyclooctadiene;
cis,trans-3,7-di-n-pentyl-1,5-cyclooctadiene;
cis,trans-3,4-dimethyl-1,5-cyclooctadiene;
cis,trans-1,2,5,6-tetraisopropyl-1,5-cyclooctadiene;
cis,trans-3-tert-butyl-1,5-cyclooctadiene;
cis,trans-1,1,2,2,3,4,5,6,7,8-deca-n-pentyl-1,5-cyclooctadiene;
cis,trans-1,2,-diethyl-1,5-cyclooctadiene;
cis,cis-1,2-dimethyl-1,4-cyclooctadiene;
cis,cis-3-ethyl-1,4-cyclooctadiene;
cis,cis-3,8,8-tri-n-propyl-1,4-cyclooctadiene;
cis,cis-1,2,4,5,6,6,7,7,8,8-decamethyl-1,4-cyclooctadiene;
cis,cis-1,4-cyclooctadiene;
cis,cis-1,2,3,3-tetra-n-butyl-1,4-cyclooctadiene;
cis,cis-1,2,4,5-tetra-n-pentyl-1,4-cyclooctadiene;
cis,cis-1,2,3,3,4,5,6,7,8-nona-n-propyl-1,4-cyclooctadiene;

cis,trans-1,2,7,7-tetramethyl-1,4-cyclooctadiene;
cis,trans-6,6,7,7,8,8-hexa-n-butyl-1,4-cyclooctadiene;
cis,trans-1,2,3,4-tetra-n-pentyl-1,4-cyclooctadiene;
cis,trans-1,2,4,5,6,6,8-heptaethyl-1,4-cyclooctadiene;
cis,trans-8-tert-butyl-1,4-cyclooctadiene;
cis,trans-3,3-di-sec-pentyl-1,4-cyclooctadiene;
cis,trans-3,3,7,8-tetraethyl-1,4-cyclooctadiene;
cis,trans-1,2,3,3,4,5,6,7,8-nona-n-propyl-1,4-cyclooctadiene;
cis,trans-1,4-cyclooctadiene; and the like.

Since the cis,cis-form of the conjugated 1,3-cyclooctadienes is the most stable form, the product obtained is a cis,cis-1,3-cyclooctadiene even though some of the cis,trans-isomer may be formed as an intermediate product. cis,cis-1,3-cyclooctadiene has the following formula:

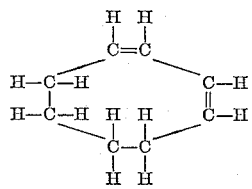

The isomerization process of this invention is carried out by contacting one of the above-described catalysts with 1,5-cyclooctadiene at a temperature generally ranging from 100 to 200° C. for a period of time generally ranging from about 30 minutes to about 24 hours. The shorter times are employed at the higher temperatures and vice versa. The amount of catalyst which is employed will generally range from about 0.1 to 10 percent by weight of the reaction mixture. If desired, an additional diluent can be employed although the cyclooctadiene can itself serve as the reaction diluent. Suitable additional diluents which can be employed include cyclohexane, benzene, heptane, and any hydrocarbon which is inert with respect to the catalyst and the products under the reaction conditions.

At the completion of the isomerization reaction, the 1,3-cyclooctadiene product can be recovered from the reaction mixture by conventional procedures, including distillation and the like. One of the advantages of the process of this invention is that 1,3-cyclooctadiene is produced in very high yield, thus rendering the work-up of the products a very simple procedure.

The specific example presented below clearly illustrates the advantages of the process of the invention, but it is not intended to unnecessarily limit the invention to the specific features thereof.

EXAMPLE

A run was carried out in which 1,5-cyclooctadiene was isomerized to 1,3-cyclooctadiene according to the process of this invention, and using a soluble complex of palladium chloride with benzonitrile.

In this run, bis(benzonitrile)palladium dichloride was prepared by mixing 4.37 grams (0.0205 mole) of $PdCl_2 \cdot 2H_2O$ with 75 ml. of benzonitrile and heating for 1.5 hours at 100–120° C. The resulting reaction mixture was filtered hot and then cooled, yielding 4.7 grams of a yellow solid material. This represents a yield of 60 percent of theoretical of the complex.

1,5-cyclooctadiene was isomerized to 1,3-cyclooctadiene by forming a mixture of 0.3 gram of bis(benzonitrile)palladium dichloride, prepared as above, with 10 ml. of 1,5-cyclooctadiene and heating the resulting solution at 140–145° C. for 1 hour. Analysis of the reaction mixture by gas-liquid chromatography showed 98 percent conversion to 1,3-cyclooctadiene. An additional 30 minutes heating, followed by analysis by gas-liquid chromatography showed 99.5 percent by weight 1,3-cyclooctadiene and 0.5 weight percent 1,5-cyclooctadiene present.

The above example clearly demonstrates the exceptional efficiency and activity of the complex catalyst used in the run. It should be noted that the batch yield of 1,3-cyclooctadiene was 99.5 percent. Since the remaining 0.5 weight percent was unconverted 1,5-cyclooctadiene, the ultimate yield was 100 percent.

Certain modifications of the invention will become apparent to those skilled in the art and the illustrative details disclosed are not to be construed as imposing unnecessary limitations on the invention.

I claim:

1. A process for isomerizing an unconjugated cyclooctadiene to a conjugated cyclooctadiene which comprises contacting said unconjugated cyclooctadiene under isomerizing conditions including a temperature in the range of about 100 to 200° C. and a reaction time in the range of about 0.5 to 24 hours with a catalyst complex of a nitrile of 2 to 12 carbon atoms selected from the group consisting of alkanenitriles, cycloalkanenitriles, and aromatic nitriles with at least one metal halide of the formula $MX_2$ wherein M is selected from the group consisting of Pt and Pd and X is selected from the group consisting of chlorine and bromine to produce said conjugated cyclooctadiene; and recovering the conjugated cyclooctadiene.

2. The process of claim 1 wherein said metal is palladium and said halide is chlorine.

3. The process of claim 2 wherein 1,5-cyclooctadiene is isomerized to 1,3-cyclooctadiene.

4. A process for isomerizing an unconjugated cyclooctadiene to a conjugated cyclooctadiene which comprises contacting said unconjugated cyclooctadiene under isomerizing conditions including a temperature in the range of about 100 to 200° C. and a reaction time in the range of 0.5 to 24 hours with bis(benzonitrile)palladium chloride as a catalyst in solution in the reaction mixture.

5. The process of claim 4 wherein 1,5-cyclooctadiene is isomerized to 1,3-cyclooctadiene.

References Cited

UNITED STATES PATENTS 3,124,621   3/1964   Crain et al. _____ 260—666

OTHER REFERENCES

J. Chatt et al.: J. Chem. Soc., London, pp. 3413–3416 (1957).

Rinehart: J. Amer. Chem. Soc., 86: 2516–18, 1964.

DELBERT E. GANTZ, *Primary Examiner.*

V. O'KEEFE, *Assistant Examiner.*